United States Patent [19]
Tertinek

[11] 3,740,067
[45] June 19, 1973

[54] COMPACTOR WHEEL ASSEMBLY
[75] Inventor: Christian T. Tertinek, Canandaigua, N.Y.
[73] Assignee: Stone Construction Equipment, Inc., Honeoyl, N.Y.
[22] Filed: June 29, 1971
[21] Appl. No.: 157,839

[52] U.S. Cl............ 280/43.24, 254/131, 280/47.32
[51] Int. Cl.............................................. B62b 1/04
[58] Field of Search.................... 280/43.24, 47.32, 280/43; 254/8 R, 131; 214/372, 373

[56] References Cited
UNITED STATES PATENTS

| | | | |
|---|---|---|---|
| 2,489,390 | 11/1949 | Stearns | 280/47.32 X |
| 3,400,944 | 9/1968 | Dion | 280/47.24 |
| 1,428,506 | 9/1922 | Krebs | 280/47.32 |
| 2,638,236 | 5/1953 | Prowinsky et al. | 214/373 |
| 2,915,318 | 12/1959 | Chesser | 280/43 |

FOREIGN PATENTS OR APPLICATIONS

| | | | |
|---|---|---|---|
| 207,011 | 3/1956 | Germany | 280/43.24 |

Primary Examiner—Benjamin Hersh
Assistant Examiner—John A. Pekar
Attorney—Clarence A. O'Brien and Harvey B. Jacobson

[57] ABSTRACT

A wheel assembly for soil compactors and the like, said assembly comprising an elongated lever arm with a laterally extending pivot pin at its lower end which is adapted to be rotatably inserted into a mounting sleeve on the compactor, a handle portion at the opposite end of the elongated lever arm, a wheel-carrying axle affixed to the lever arm at a point intermediate the pivot pin and the handle portion, and a rigid mounting bracket attached to the lever arm between the wheel axle and the handle portion. The mounting bracket extends in a lateral direction from the lever arm and includes a pair of mounting tabs extending in opposite directions and adapted to fit under a mounting flange or lip on the compactor housing. The relative positions of the pivot pin and wheel axle provide a mechanical advantage for easy raising of the compactor by manipulation of the lever arm.

3 Claims, 4 Drawing Figures

PATENTED JUN 19 1972

3,740,067

Christian T. Tertinek
INVENTOR

BY O'Brien
and Harvey B. Jacobson
Attorneys

COMPACTOR WHEEL ASSEMBLY

In the past, it was necessary to transport compactors and similar wheeless construction equipment by hand-carrying the equipment over the desired distance. Since such equipment is generally very heavy, such carrying was extremely strenuous and time-consuming and often required the use of several workers. Various add-on wheel constructions have been proposed, but such were either too expensive to produce or required strenuous lifting and movement of the equipment in order to achieve mounting.

It is an object of the present invention to provide a novel removable wheel assembly which may be mounted to a compactor or the like in a matter of seconds and by a single individual for movement over relatively short distances on the job site.

Another object of the present invention is to provide a unique wheel assembly which may be mounted to a compactor or similar construction equipment and which includes means for easily raising the equipment above the ground to provide adequate clearance for wheeled movement.

A further object of the present invention is to provide a versatile removable wheel assembly which is adapted to be fitted to standard construction equipment and which is interchangeable between right and left hand side mountings, such that both right and left hand wheels may be provided by wheel assemblies of the same construction.

Still another object of the present invention is to provide a removable wheel assembly for soil compactors and the like, which is comprised of a minimum number of parts, is rugged, durable, and long lasting, yet relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
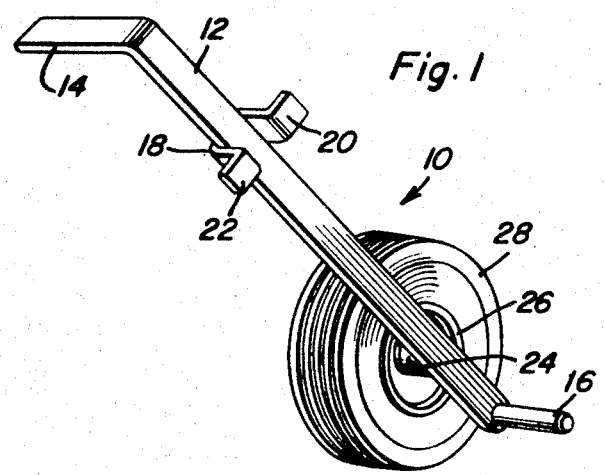
FIG. 1 is a perspective view of the removable wheel assembly of the present invention.

Referring, now, more particularly to FIG. 1, the removable wheel assembly of the present invention is generally indicated by the numeral 10 and includes an elongated lever arm 12 with a laterally extending handle portion 14 at its upper end. The opposite end of the lever arm is provided with a pivot pin or mounting shaft 16 which extends in a direction generally perpendicular to the lever arm. A mounting bracket 18 extends laterally from lever arm 12 in a direction which generally parallels that of pivot pin 16. The mounting bracket is provided with a pair of mounting tabs 20 and 22 which extend in opposite directions and lie in a plane generally parallel to that of lever arm 12. A wheel axle 24 is affixed to the lever arm at a point intermediate pivot pin 16 and mounting bracket 18 and extends laterally from the lever arm but in a direction opposite to that of pivot pin 16. A wheel or hub 26 is rotatably mounted to axle 24 and may be provided with a tire 28 of the pneumatic or hard rubber type.

Figure 4:
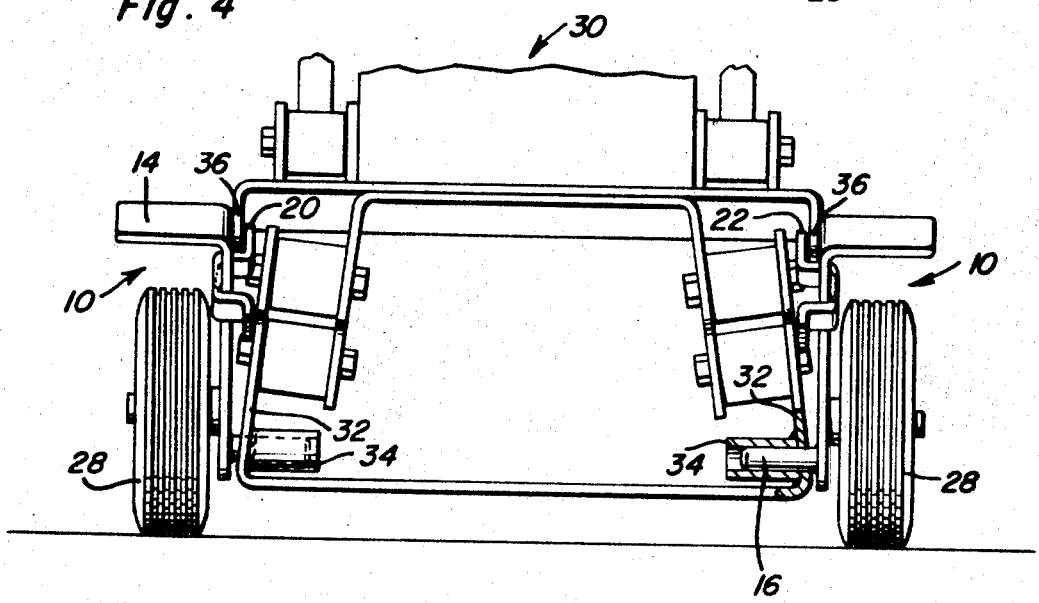
FIG. 4 is an end view of a typical compactor with the wheel assemblies of the present invention being mounted thereto on both the right and left hand sides.

Referring to FIG. 4, the mounting of the wheel assembly of the present invention will be more fully appreciated. A pair of wheel assemblies 10 are illustrated as they are mounted to a typical soil compactor generally indicated by the numeral 30. Of course, it should be noted that the wheel assemblies are not restricted to use with the compactor shown in FIG. 4 and may be used with a variety of compactors and similar construction equipment so long as proper mounting is provided. The framework of compactor 30 includes a pair of side walls 32 each of which is provided with a mounting sleeve 34 which is adapted to receive pivot pin 16 of the wheel assembly. The compactor includes an apron having a downwardly extending flange or edge portion portion 36 spaced above each mounting sleeve 34 such that a mounting tab of each mounting bracket may be inserted thereunder. The weight of the compactor pressing down on the pivot pins 16 tends to force the mounting brackets in the upward direction against flange 36, thus holding mounting tabs 20 and 22 firmly in place once they have been positioned.

Figure 2:
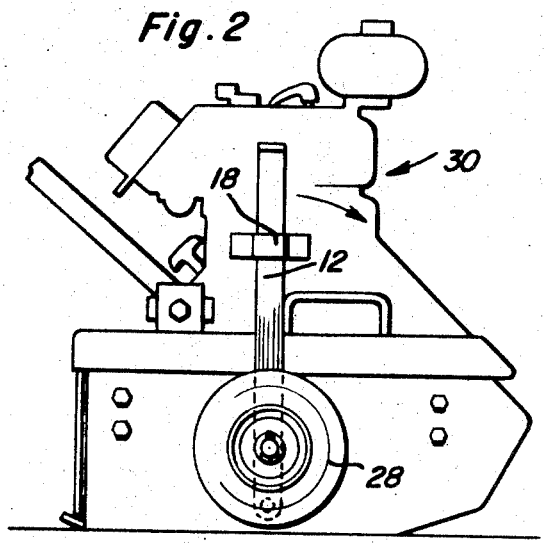
FIG. 2 is a simplified side elevation of a typical compactor with the wheel assembly of the present invention shown in the vertical position during the initial step of installation.
Figure 3:
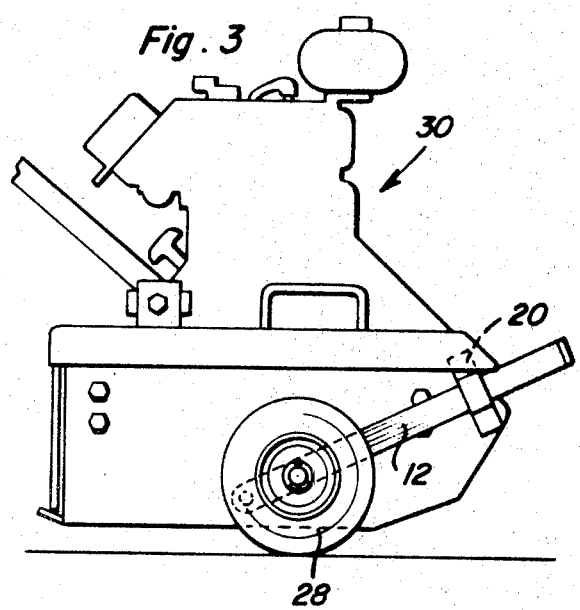
FIG. 3 is a side elevation of the compactor shown in FIG. 2 with the wheel assembly of the present invention mounted in the wheeling position.

It should be noted that opposed to conventional add-on wheel assemblies, the wheel assembly of the present invention provides a means of easily raising the compactor above the ground to assure adequate clearance during wheeled movement. Installation of the wheel assembly and raising of the compactor above the ground is best illustrated in FIGS. 2 and 3. For installation, the wheel assembly is first held in the vertical position and its pivot pin is inserted into the mounting sleeve in the compactor framework as shown in FIG. 2. Lever arm 12 is then rotated toward the horizontal position such that its wheel engages the ground surface. Continued movement of the lever arm toward the horizontal position raises the compactor above the ground surface by way of the pivot pin connection. After mounting bracket 18 has cleared the lowermost edges of flange 36, the lever arm is moved transversely to the compactor framework such that mounting tab 20 extends under the flange. The lever arm is then released and the weight of the compactor firmly seats mounting tab 20 under flange 36 as shown in FIG. 3. It will be appreciated that during the installation procedure, the lever arm arrangement provides a mechanical advantage which permits an individual to easily raise a compactor weighing several hundred pounds. It should be noted that due to the symmetry of the wheel assembly, it may be installed on the right and left hand sides of the compactor by utilizing tab 20 on one side and tab 22 on the opposite side.

Preferably, the elongated lever arm, its mounting bracket and pivot pin are of all steel welded construction. When light-weight features are desired, aluminum or similar materials may be utilized. Also, changes in the size or exact location of the wheel to effect the mechanical advantage or compactor clearance are deemed to fall within the scope of the present invention.

From the foregoing description it will be appreciated that the removable wheel assembly of the present invention is comprised of a relatively small number of parts and is relatively inexpensive to produce, yet is rugged, durable and long lasting. The fact that the wheel assembly of the present invention may be operated by a single worker, rather than several workers as required by conventional devices, results in substantial savings in labor costs required to transport a compactor about the job site. When the compactor is in use, the wheel assemblies may be easily dismounted by reversing the installation procedure explained above. When desired, however, the wheel assemblies may be left on the compactor framework in a vertical position such as that shown in FIG. 2, each wheel assembly being held in place by straps, shock cords, or other convenient fastening means.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a compactor which normally rests on the ground and which includes a mounting sleeve and a rigid apron with a downwardly turned edge portion, a wheel assembly comprising an elongated lever arm having first and second ends, a pivot pin connected to the first end of said lever arm and selectively rotatably received by said mounting sleeve in said compactor, a wheel connected to said elongated lever arm at a location intermediate said pivot pin and said second end, bracket means connected to said elongated lever arm for selective retentive engagement with said downwardly turned edge portion on the compactor apron to firmly hold said wheel assembly in proper position under the influence of the weight of the compactor, and handle means connected to said elongated lever arm for rotation thereof to raise the compactor above the ground by way of said pivot pin connection, said handle means and said wheel being disposed on one side of said elongated lever arm and said pivot pin being disposed on the opposite side of said elongated lever arm, said wheel being mounted substantially closer to said pivot pin than said handle means to provide a mechanical advantage for raising the compactor during rotation of said lever arm, said bracket being affixed to and extending from said elongated lever arm on the same side thereof as said pivot pin and including at least one mounting tab which lies in a plane generally perpendicular to said pivot pin and generally parallel to said downwardly turned apron edge portion.

2. The structure set forth in claim 1 wherein said handle means is comprised of a laterally extending integral portion of said lever arm.

3. The structure set forth in claim 1 wherein said mounting bracket includes a second mounting tab extending in a direction opposite said one mounting tab such that the same wheel assembly may be used for mounting on both the right and left hand sides of a piece of construction equipment.

* * * * *